(12) United States Patent
Jiang

(10) Patent No.: US 10,243,722 B2
(45) Date of Patent: Mar. 26, 2019

(54) OPTICAL INTERCONNECTING NETWORK ARCHITECTURE

(71) Applicant: Zhiping Jiang, Kanata (CA)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/358,734

(22) Filed: Nov. 22, 2016

(65) Prior Publication Data

US 2018/0146270 A1    May 24, 2018

(51) Int. Cl.
| | | |
|---|---|---|
| *H04B 10/00* | (2013.01) | |
| *H04L 7/00* | (2006.01) | |
| *H04Q 11/00* | (2006.01) | |
| *H04J 14/02* | (2006.01) | |

(52) U.S. Cl.
CPC ........ *H04L 7/0075* (2013.01); *H04J 14/0284* (2013.01); *H04Q 11/0062* (2013.01); *H04Q 11/0066* (2013.01); *H04Q 2011/0086* (2013.01)

(58) Field of Classification Search
CPC ........... H04Q 11/0005; H04Q 11/0062; H04Q 2011/0052; H04Q 2011/0015; H04Q 2011/0016; H04Q 2011/0086; H04B 10/50; H04B 10/27; H04B 10/61; H04J 14/02; H04L 7/0075
USPC ..................................................... 398/66–72
See application file for complete search history.

(56) References Cited

U.S. PATENT DOCUMENTS

| | | | | |
|---|---|---|---|---|
| 7,209,657 B1 * | 4/2007 | Islam | ................. | H04Q 11/0005 398/45 |
| 8,090,256 B2 * | 1/2012 | Reisslein | ............ | H04J 14/0227 398/17 |
| 8,693,374 B1 * | 4/2014 | Murphy | ................. | H04L 12/28 370/255 |
| 9,787,400 B2 * | 10/2017 | Bourg | .................... | H04B 10/27 |
| 2003/0002776 A1 * | 1/2003 | Graves | .................... | H04J 14/02 385/16 |
| 2005/0008369 A1 | 1/2005 | Winzer | | |

(Continued)

FOREIGN PATENT DOCUMENTS

| | | |
|---|---|---|
| CN | 1576922 A | 2/2005 |
| CN | 102075822 A | 5/2011 |

(Continued)

OTHER PUBLICATIONS

U.S. Appl. No. 15/164,165, 'Optical Communications System With Centralized Wavelength Source', filed May 25, 2016.

(Continued)

*Primary Examiner* — Agustin Bello

(57) ABSTRACT

Aspects of the present application provide an optical interconnecting network architecture. The architecture involves a central node coupled to multiple access nodes (ANs), in which the central node includes a pair of optical couplers used to combine optical signals received from the ANs and broadcast the combined optical signals to all destination ANs. A coherent detection receiver in each of the ANs receives the combined optical signals and selectively detects a wavelength carrying the optical signal assigned to that AN by tuning a local oscillator (LO) wavelength of the coherent detection receiver.

30 Claims, 10 Drawing Sheets

(56) References Cited

U.S. PATENT DOCUMENTS

| | | | |
|---|---|---|---|
| 2007/0116061 A1* | 5/2007 | Meagher | H04J 3/07 370/503 |
| 2008/0037987 A1* | 2/2008 | Bradley | H04B 10/0773 398/59 |
| 2011/0200051 A1* | 8/2011 | Rivaud | H04J 3/0641 370/400 |
| 2012/0008723 A1* | 1/2012 | Stojanovic | H03L 7/091 375/355 |
| 2012/0128369 A1* | 5/2012 | Hann | H03L 7/07 398/138 |
| 2016/0261364 A1* | 9/2016 | Jiang | H04J 14/0282 |
| 2016/0301474 A1* | 10/2016 | Bourg | H04B 10/27 |
| 2016/0323660 A1 | 11/2016 | Jiang et al. | |
| 2017/0010420 A1* | 1/2017 | Jiang | G02B 6/35 |
| 2017/0134089 A1* | 5/2017 | Mansouri Rad | H04B 10/07953 |

FOREIGN PATENT DOCUMENTS

| | | |
|---|---|---|
| CN | 102202248 A | 9/2011 |
| CN | 102377724 A | 3/2012 |
| WO | 2010080721 A1 | 7/2010 |

OTHER PUBLICATIONS

Kachris, Christoforos et al., "A Survey on Optical Interconnects for Data Centers", IEEE Communications Surveys & Tutorials, vol. 14, No. 4, Fourth Quarter 2012, pp. 1021-1036.

Farrington, Nathan et al., "Helios: A Hybrid Electrical/Optical Switch Architecture for Modular Data Centers", SIGCOMM'10, Aug. 30-Sep. 3, 2010, 12 pages.

Hawkins, Cory et al., "The Data Vortex, an All Optical Path Multicomputer Interconnection Network", IEEE Transactions on Parallel and Distributed Systems, vol. 18, No. 3, Mar. 2007, pp. 409-420.

Chiaroni, Dominique et al., "Packet OADMs for the Next Generation of Ring Networks", Bell Labs Technical Journal, DOI:10.10002bltj, vol. 14, No. 4, 265-283, 2010.

* cited by examiner

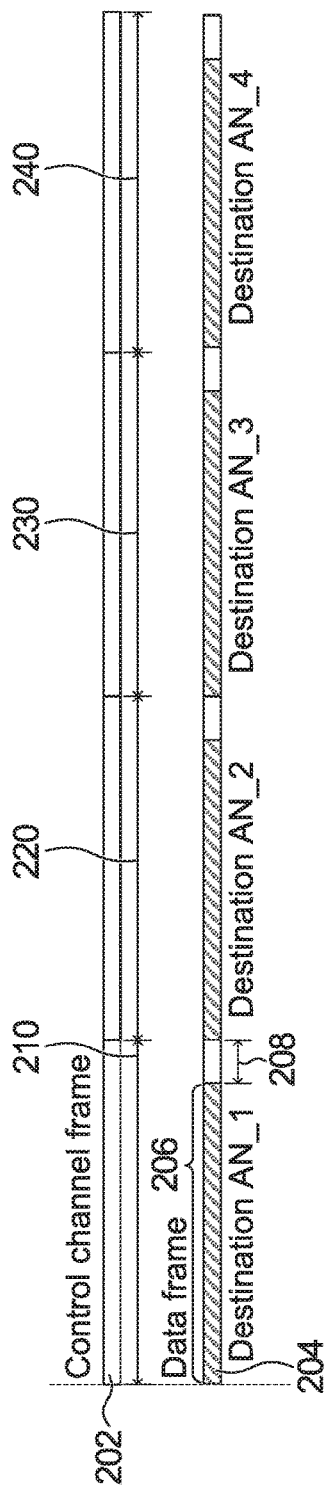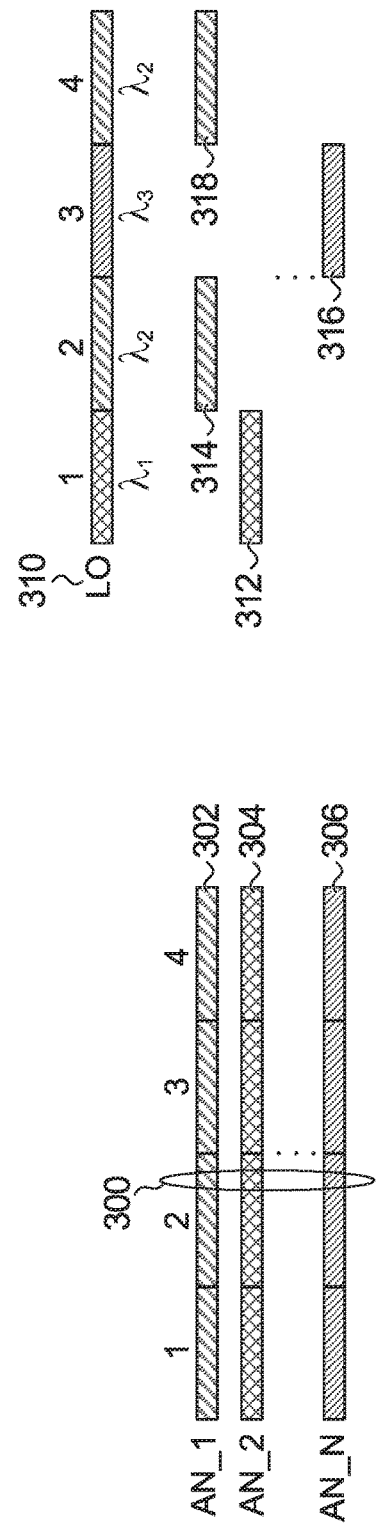

OPTICAL INTERCONNECTING NETWORK ARCHITECTURE

FIELD OF THE DISCLOSURE

This application relates to optical communication systems, and more particularly an optical interconnecting network architecture.

BACKGROUND

There are various types of switching architectures in optical communications. Switching the signals in optical domain may provide cost savings. However, optical switching often lacks required versatility in controlling flows of information. To provide a greater versatility, one may rely on some level of optical to electrical conversion and electrical to optical conversion. Such processing can cause a delay or latency to the signal being processed. In addition, as the scale of the number of signals being routed increases, an interconnecting network becomes more complicated, more expensive, and requires more power to implement.

Alternative optical switching architectures, which strike a balance between cost and performance, are therefore desirable.

SUMMARY OF THE DISCLOSURE

According to an aspect of the disclosure, there is provided an optical central node for interconnecting a plurality of access nodes. The optical central node includes a coupler configured to combine optical data signals from the plurality of access nodes each transmitting on a different wavelength, to obtain a combined optical signal, a splitter configured to couple the combined optical signal to each one of a plurality of optical outputs for broadcasting to the plurality of access nodes and a controller. The controller is configured to: obtain first control information associated with a source node of the plurality of access nodes; and provide second control information based on the first control information for coherent detection of an optical data signal from the source node at a destination node of the plurality of nodes.

In some embodiments, the first control information includes a connection request received from the source node.

In some embodiments, the second control information comprises a wavelength for a local oscillator of the destination node to be tuned to for coherent detection of the optical data signal from the source node, wherein the controller is further configured to transmit the second information to the destination node.

In some embodiments, the second control information comprises information defining when the source access node is scheduled to transmit the optical data signal, wherein the controller is further configured to transmit the second information to the source node.

In some embodiments, the controller is further configured to transmit the second control information to the destination node.

In some embodiments, the controller is further configured to transmit a control signal carrying at least one of the first and second control information, wherein the control signal comprises as least one of an out-of-band (OOB) optical signal and an electrical signal.

In some embodiments, the control signal carries the first control information and comprises the OOB optical signal, which is generated at the source node, and wherein the source node comprises a wavelength division multiplexer (WDM), configured to combine the optical data signal and the generated OOB optical signal.

In some embodiments, the control signal carries the second control information and comprises the OOB optical signal, wherein the destination node comprises a wavelength division demultiplexer (WDD) configured to separate the optical data signals and the second control information associated with the respective optical data signal.

In some embodiments, the coupler includes a wavelength division multiplexer (WDM).

In some embodiments, the controller is configured to synchronize the optical data signals by: determining a timing misalignment between an optical data signal of each access node of the plurality of access nodes and a reference timing signal; and sending a timing adjustment message to each of the access nodes in order to control when the transmission of the optical data signals occur to synchronize the timing of the access nodes with the reference timing signal.

In some embodiments, the controller is configured to synchronize the optical data signals by: determining a timing misalignment between an optical data signal of a first access node of the plurality of access nodes and an optical data signal of a second access node of the plurality of access nodes; sending a timing adjustment message to the second access node in order to control when the transmission of the optical data signal occurs to synchronize the timing of the first access node and the second access node; and repeating the determining and sending between the first access node and other access nodes of the plurality of access nodes until the optical data signals of the plurality of access nodes are synchronized.

In some embodiments, the controller is configured to perform scheduling of transmissions of the plurality of access nodes.

In some embodiments, the optical central node further includes an optical amplifier located subsequent to the coupler to amplify the set of the multiplexed optical signals.

In some embodiments, the plurality of access nodes is coupled to the optical central node in a star configuration.

According to an aspect of the disclosure, there is provided a method for interconnecting a plurality of access nodes. The method involves obtaining first control information associated with each source node of the plurality of access nodes and providing second control information based on the first control information for coherent detection of the optical data signals at each destination node of the plurality of access nodes. The method also includes receiving optical data signals from the plurality of access nodes each transmitting on different wavelengths, combining the optical data signals from the plurality of access nodes to obtain a combined optical signal and coupling the combined optical signal to each one of a plurality of optical outputs for broadcasting to the plurality of access nodes. The method further includes transmitting the second control information to at least some of the plurality of access nodes.

In some embodiments, the first control information comprises connection requests from source nodes of the plurality of access nodes.

In some embodiments, the second control information comprises at least one of: wavelengths for local oscillators of destination nodes of the plurality of access nodes to be tuned to; and information defining when each source access node is scheduled to transmit an optical data signal.

In some embodiments, transmitting the second control information comprises at least one of: transmitting to the source nodes information defining when the source nodes are scheduled to transmit the optical data signals so the source nodes know when to transmit the optical data signals; and transmitting to the destination nodes information defining when the source nodes are scheduled to transmit the optical data signals and the wavelength so the destination nodes know when to switch the local oscillators of the destination nodes to coherently detect the optical data signals.

In some embodiments, the optical data signals are divided into slots.

In some embodiments, the slots are divided into sub-slots.

In some embodiments, synchronizing the optical data signals from the plurality of access nodes involves: determining a timing misalignment between an optical data signal of a first access node of the plurality of access nodes and an optical data signal of a second access node of the plurality of access nodes; sending a timing adjustment message to the second access node in order to control when the transmission of optical data signals occurs in order to synchronize the timing of the first access node and the second access node; and repeating the determining and sending between the first access node and other access nodes of the plurality of access nodes until the optical data signals of the plurality of access nodes are synchronized.

In some embodiments, the method involves scheduling of transmissions of the plurality of access nodes.

In some embodiments, the method further involves receiving third control information from a software defined networking (SDN) controller that coordinates connections and schedules connections between access nodes of the plurality of access nodes; and generating second control information based on the third control information.

According to an aspect of the disclosure, there is provided a system including a plurality of access nodes, each access node configured to transmit and receive an optical signal, and a central node. When transmitting, an access node is configured to transmit an optical data signal using a fixed wavelength optical source and first control information and when receiving, an access node is configured to receive an optical signal and coherently detect a portion of the optical signal using a switchable wavelength local oscillator. The central node includes a coupler configured to combine optical data signals from the plurality of access nodes each transmitting on a different wavelength, to obtain a combined optical signal. The central node also includes a splitter configured to couple the combined optical signal to each one of a plurality of optical outputs for broadcasting to the plurality of access nodes. The central node also includes a central node controller configured to obtain first control information from each source node of the plurality of access nodes and generate second control information based on the first control for coherent detection of the optical data signals at each destination node of the plurality of access nodes and transmit the second control information to at least some of the plurality of access nodes.

In some embodiments, the first control information comprises connection requests received from the source nodes of the plurality of access nodes.

In some embodiments, the second control information comprises at least one of: wavelengths for local oscillators of destination nodes of the plurality of access nodes to be tuned to; and information defining when a source access node is scheduled to transmit an optical data signal.

In some embodiments, the optical data signals from the plurality of access nodes of the combined optical data signal are synchronized at an output port of the coupler.

In some embodiments, the central node performs scheduling of transmissions of the plurality of access nodes.

In some embodiments, the central node is configured to multicast a same optical data signal to more than one destination access node.

In some embodiments, the central node is controlled by a software defined networking (SDN) controller, the SDN controller also configured to control a central node in a second system such that the central node of the second system appears to the central node as an access node.

According to an aspect of the disclosure there is provided an access node line card including an optical receiver coupled to a variable wavelength local oscillator for detecting a portion of a received optical signal, an optical transmitter coupled to a fixed wavelength optical source for generating an optical data signal and a processor coupled to the optical transmitter and optical receiver. The processor is configured to provide a data signal to the optical transmitter and obtain a data signal from the optical receiver, generate first control information to be transmitted with the optical data signal and receive second control information for coherently detecting the portion of the received optical signal.

In some embodiments, the first control information or the second control information is carried by at least one of: an out-of-band (OOB) optical signal that is synchronized, and transmitted with, a respective optical data signal; and an electrical signal that is synchronized with a respective optical data signal.

In some embodiments, the access line card includes a queue buffer configured to buffer data to be transmitted before transmission or data being received, or both.

According to an aspect of the disclosure there is provided a method for detecting an optical data signal. The method involves receiving control information defining when a signal of a set of combined optical data signals is scheduled to be detected, tuning a variable wavelength optical source local oscillator to a wavelength of an optical data signal scheduled to be received, receiving an optical signal comprising a set of combined optical data signals including the optical data signal scheduled to be received, and coherently detecting the optical data signal scheduled to be received from the set of combined optical data signals.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which:

FIG. 2 illustrates an example of a frame structure used for transmission according to an aspect of the disclosure;

FIG. 3A illustrates an example of a frame structure as observed at a receiver according to an aspect of the disclosure;

FIG. 3B illustrates an example of a frame structure indicating how signals for particular receivers can be detected according to an aspect of the disclosure;

DETAILED DESCRIPTION OF EMBODIMENTS

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the designs and implementations illustrated and described herein, but may be modified within the scope of the appended claims along with their full scope of equivalents.

Aspects of the present application provide an optical interconnecting network architecture. In some aspects of the disclosure, the basis of the architecture involves a central node coupled to multiple access nodes (ANs), the central node including a pair of optical couplers that are used to combine optical signals received from the ANs and broadcast the combined optical signals to all destination ANs. A coherent detection receiver in each of the ANs receives the combined optical signals and selectively detects a wavelength carrying the optical signal assigned to that AN by tuning a local oscillator (LO) wavelength of the coherent detection receiver.

The architecture may provide reduced power consumption, reduced latency, high switching capacity and scalability in a network interconnection implementation. Due to the basic nature of the components used in the architecture, implementation may also be of low cost. Aspects of the application may also enable broadcast capability from a single source to multiple destinations with low latency. The present architecture may also have better spectral efficiency and support a larger number of ANs.

Figure 1:
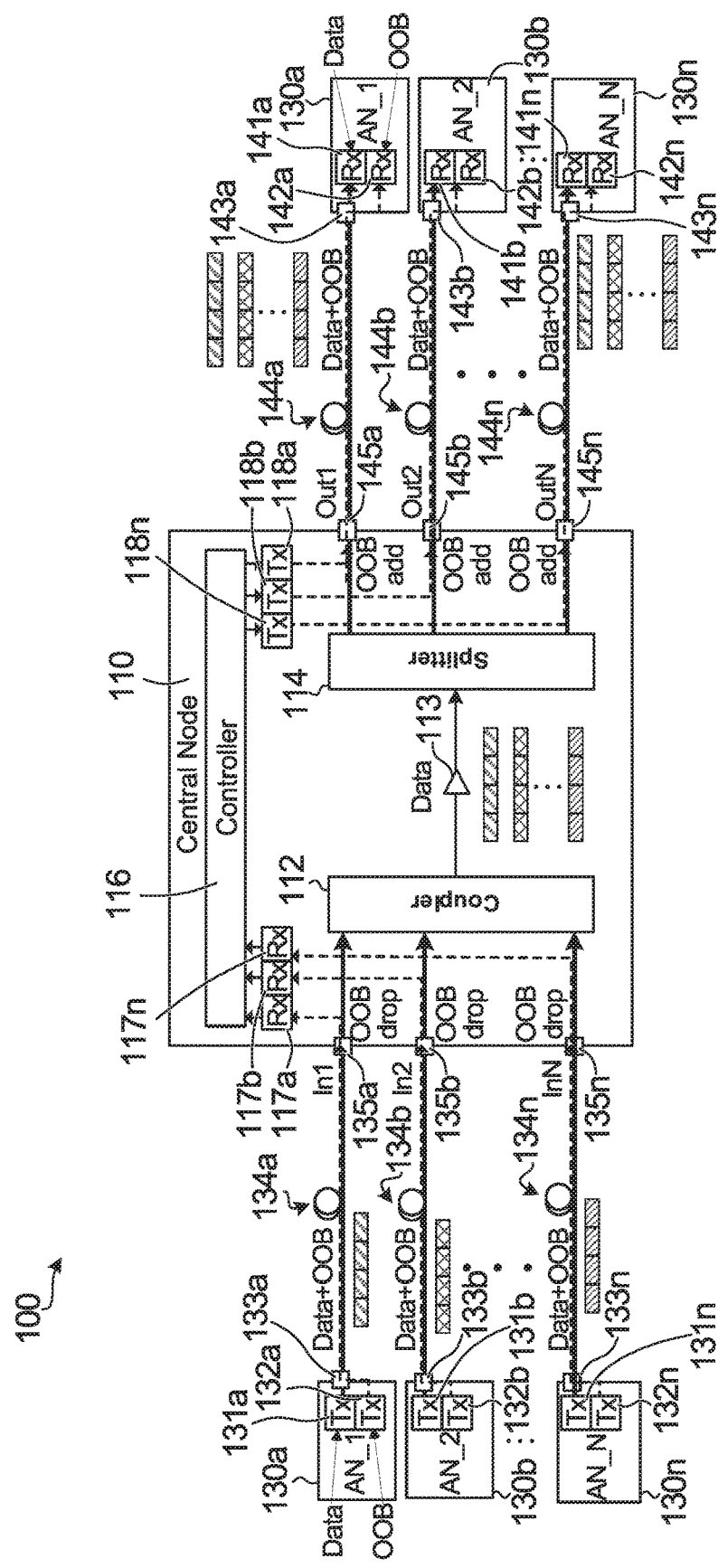
FIG. 1 is a schematic diagram of a coherent wavelength switching architecture according to an aspect of the disclosure.

FIG. 1 is an example of the switching architecture 100 according to an aspect of this disclosure. FIG. 1 includes a central node 110 and N access nodes (AN) 130a, 130b, ... 130n communicatively coupled to inputs 135a, 135b, ..., 135n of the central node 110 and communicatively coupled to outputs 145a, 145b, ..., 145n of the central node 110. The N ANs 130a, 130b, ... 130n are shown twice to emphasize the structure for the ANs to transmit to the central node 110 and to receive from the central node 110. The central node 110 can receive an input signal from each of the ANs 130a, 130b, ..., 130n that includes a data signal and a control signal.

In FIG. 1, the data signal is generated by the AN by converting an electrical data signal to an optical data signal. This is information that is being sent from a source AN to a destination AN. The control signal may be generated by the AN by converting an electrical control channel signal to an out-of-band (OOB) control channel (CC) optical signal. The control channel signal includes information that is communicated between the AN and the central node, such as, but not limited to, slot assignment request information from the AN to the central node, slot grant information from the central node to the AN, timing adjustment information from the central node to the AN, and frame index information. The slot assignment request information and slot grant information is used by the central node to route the data signal to the destination. The timing adjustment information may be used to synchronize control channel frames with data channel frames so that the control channel frames and data channel frames are aligned at the central node.

Each AN 130a, 130b, ..., 130n includes a transmitter 131a, 131b, ..., 131n for generating the optical data signal. Each AN 130a, 130b, ..., 130n includes a transmitter 132a, 132b, ..., 132n for generating the OOB CC optical signal. Each AN 130a, 130b, ... 130n also includes a coupler 133a, 133b, ..., 133n for combining the optical data signal and the OOB CC optical signal. The coupler may be a wavelength division multiplexer. The combined optical signals propagate along an optical fiber 134a, 134b, ..., 134n between the ANs 130a, 130b, ..., 130n and the inputs 135a, 135b, ..., 135n of the central node 110.

The transmitters 131a, 131b, ..., 131n for generating the optical data signals each have a different fixed wavelength within a bandwidth allocated for data transmission. The transmitters 132a, 132b, ..., 132n for generating the OOB CC optical signals each have a different fixed wavelength outside of the bandwidth allocated for data transmission. The transmitters of the ANs can be operated in continuous mode or burst (or slot) mode. However, both slot and burst modes are different than continuous mode. When transmitting to a destination AN, the transmitting AN may be operated in slot or burst mode. The optical signal can be transmitted in slot mode, or in continuous mode with slotted data.

The inputs 135a, 135b, ..., 135n of the central node 110 each include some form of wavelength selecting device, such as a wavelength division demultiplexer (WDD) to drop the wavelength of the OOB CC optical signal from each respective input signal. The inputs 135a, 135b, ..., 135n pass the wavelengths of the data signals onto a first wavelength division multiplexing (WDM) coupler 112, or optical wavelength division multiplexer, that combines the optical data signals from the various ANs into a combined optical signal. In the example of FIG. 1, the combined optical signal is amplified by an amplifier 113. In some embodiments, an amplifier may not be necessary. An optical splitter 114, receives the combined optical signal and broadcasts the combined optical signal into each of outputs 145a, 145b, ..., 145n.

The OOB CC optical signals dropped by inputs 135a, 135b, ..., 135n are each provided to an O/E receiver 117a, 117b, ..., 117n and an electrical output from the O/E receivers 117a, 117b, ..., 117n is provided to a controller 116. The controller 116 is responsible for slot synchronization and scheduling of the data signals from the source ANs to the destination ANs.

Outputs from the controller 116 that are generated to accompany the respective optical data signals are recombined with the optical data signal at, or before, the outputs 145a, 145b, . . . , 145n of the central node 110. Electrical control channel signals are generated at least in part based on the first OOB CC signals received by the controller 116 and are sent to destination ANs to synchronize the signals and schedule transmissions. For example, the control channel information may include timing adjustment information to synchronize the frames of the data signals and/or the frames for the control information and the wavelength that a destination AN needs to tune its own local oscillator to so that the destination AN can coherently detect a proper data signal. The electrical control channel signals are converted by E/O transmitters 118a, 118b, . . . , 118n top OOC CC optical signals before being recombined with the optical data signal at the outputs 145a, 145b, . . . , 145n.

The outputs 145a, 145b, . . . , 145n on the central node are communicatively coupled to the ANs 130a, 130b, . . . , 130n via optical fibers 144a, 144b, . . . , 144n. Each of the ANs 130a, 130b, . . . , 130n receives a version of the combined optical signal.

Each AN 130a, 130b, . . . 130n includes a WDM demultiplexer 143a, 143b, . . . , 143n for separating optical data signals at different wavelengths and the OOB CC optical signal. Each AN 130a, 130b, . . . , 130n includes a receiver 141a, 141b, . . . , 141n for converting the optical data signal into an electrical data signal. Each AN 130a, 130b, . . . , 130n also includes a receiver 142a, 142b, . . . , 142n for converting the OOB CC optical signal into an electrical control channel signal. The receivers of the ANs can operate in burst mode. Burst mode allows the receiver to receive a burst of data.

Figure 6:
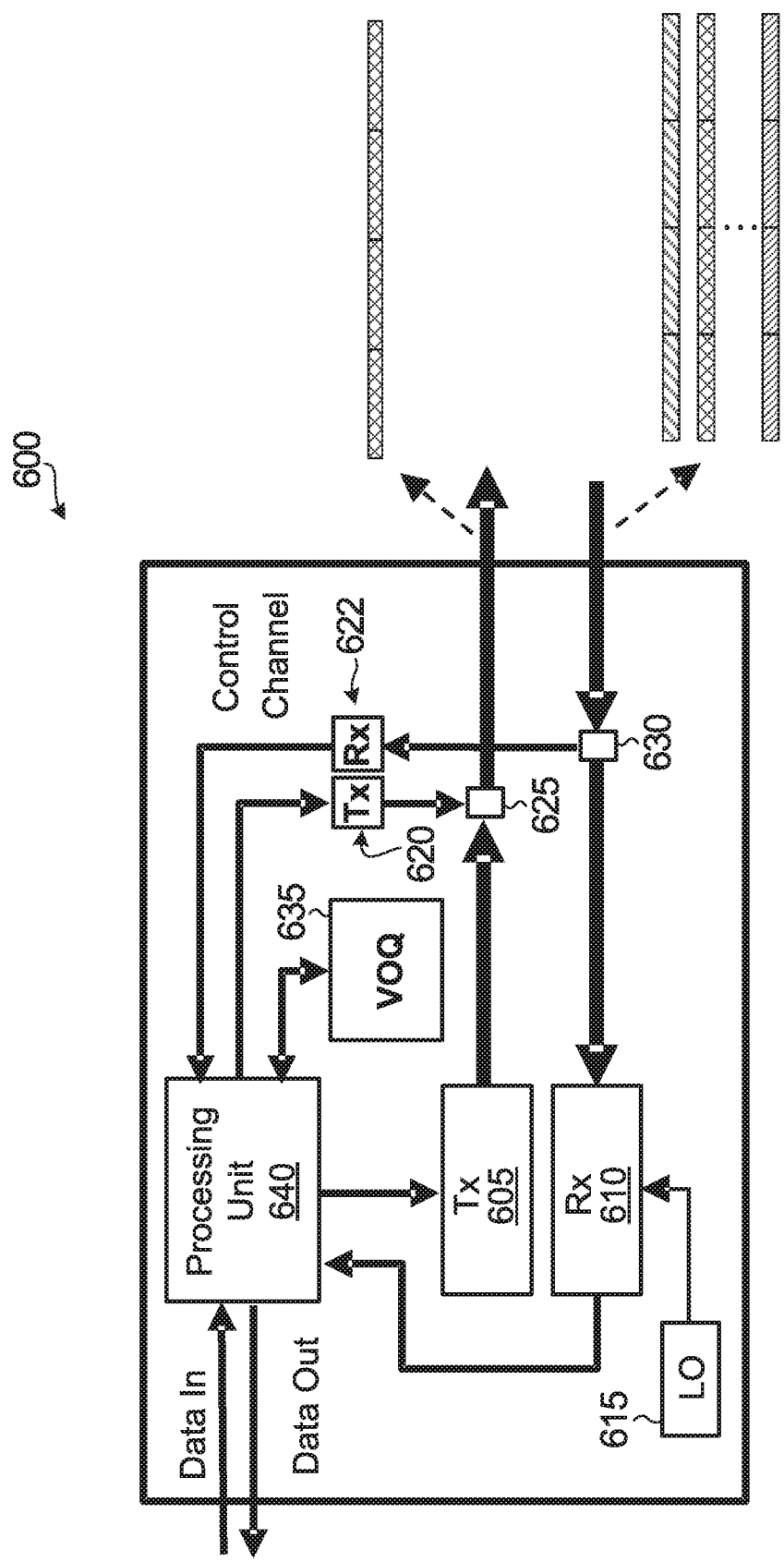
FIG. 6 is a schematic diagram of an access node line card according to an aspect of the disclosure.

It should be understood that the transmitters 131a, 131b, . . . , 131n, the transmitters 132a, 132b, . . . , 132n, the receivers 141a, 141b, . . . , 141n and the receivers 142a, 142b, . . . , 142n, respectively, would be collocated in the same ANs. For example, transmitters 131a and 132a and receivers 141a and 142a may be collocated on a single line card that is AN 130a. An example line card is shown in FIG. 6 and will be described in further detail below.

Upon receiving the control channel information, a given AN uses the control channel information to tune the LO of the AN receiver so as to enable the AN to coherently detect the data signal associated with the control channel information. The tuning of the LO can be done on a slot by slot basis. The LO wavelength is switched in time slot fashion. The LO wavelength switching is coordinated by the control channel and synchronized with the data slot.

The ANs are described above as having transmitters for transmitting the optical data signals and OOB CC optical signals to the central node and receivers for receiving the optical data signals and OOB CC optical signals from the central node. However, it is to be understood that any given AN typically includes both transmitters and receivers to enable the AN to both send and receive data. For example, an AN transmitting to the central node also needs to receive information from the central node for synchronizing the data and control signals with other ANs.

While the OOB control channel signals of FIG. 1 are described as being transmitted bi-directionally between the ANs and the central node as optical signals together with the data signals, it should be understood that the control channel signal could be transmitted bi-directionally between the ANs and the central node using an electrical connection. In such an implementation, the AN would not need an E/O transmitter to convert the control channel signal to an OOB CC optical signal. There would also not be a need for a coupler to combine the OOB CC optical signal and optical data signal. The electrical control channel signal may be transmitted to the central node with identification information that associates the electrical control channel signal with the data signal. If the control signal channel is transmitted as a separate electrical signal from that of the optical data signal, slot timing synchronization may be more difficult as the optical data signal and the electrical control signal are obviously not traveling in the same fiber. Propagation delay between the two signals may need to be compensated for, unless the propagation delay is negligible. The control channel has a bi-directional connection between the ANs and the central node to allow for slot synchronization and scheduling the transmission of the ANs.

In some implementations, the AN may be configured to transmit the control information using either an electrical signal or an optical signal. In some implementations, some ANs may be connected to the central node such that the control channel information is exchanged electrically, while other ANs may be connected to the central node such that the control channel information is exchanged optically.

The wavelength used by each AN for transmission of the data is fixed. However, in some embodiments, the AN may have a tunable source that allows the AN to use a different wavelength, as long as different wavelength is not the same as any other wavelengths currently being used by other ANs and as long as the central node has knowledge of the wavelength being used by the transmitting AN and can adequately notify the destination AN of the wavelength being used by the transmitting AN. FIG. 2 illustrates a representation of a portion of a control channel and corresponding portion of a data channel that are generated by an AN. Both representative portions of the control channel and the data channel are divided into four slots 210, 220, 230 and 240. Each slot includes a control channel frame 202 and a data frame 204. The data frame 204 includes a data portion 206 to be sent to a destination AN and a guard time 208. The guard time 208 does not contain useful data, but is used to allow the receiver in the AN to be fast switched and locked to another wavelength. Each data channel has an associated control channel that may be synchronized to the data frame. While FIG. 2 illustrates that the control channel frame 202 has the same duration as the data frame 204, and the control channel frame 202 has the same starting point as the data frame 204, this is not always necessary. More generally, there is at least a fixed timing relationship between the control channel frame 202 and the data frame 204. In the slot 210, the data is destined for AN_1. In the slot 220, the data is destined for AN_2. In the slot 230, the data is destined for AN_3. In the slot 240, the data is destined for AN_4.

FIG. 3A illustrates a representation of a portion of N individual and synchronized optical signals 302, 304 and 306 that together form a combined optical signal 300 from multiple transmitting ANs AN_1, AN_2, . . . , AN_N. The portion of the combined optical signal 300 has four slots. The individual optical signals 302, 304, 306 each include an optical data signal and a control signal. AN_1 transmits using a wavelength of $\lambda_2$. AN_2 transmits using a wavelength of $\lambda_1$. AN_N transmits using a wavelength of $\lambda_3$.

For an example AN receiving the combined optical signal 300 from the central node, FIG. 3B illustrates how the detected optical signal may be switched by switching the LO wavelength. The wavelength of the LO is shown to be $\lambda_1$ in a first slot, $\lambda_2$ in a second slot, $\lambda_3$ in a third slot and $\lambda_2$ in a fourth slot. Based on the LO being switched to the wavelengths identified above, the receiver ends up detecting the signal 312 from AN_2 in the first slot, the signal 314 from AN_1 in the second slot, the signal 316 from AN_N in the third slot and the signal 318 from AN_1 in a fourth slot.

A fixed slot duration is used for synchronization and scheduling. However, in some embodiments, the fixed slot duration can be further divided into sub-slots. Because the AN is using coherent detection, sub-dividing the slots does not affect detection at other ANs.

Figure 3C:
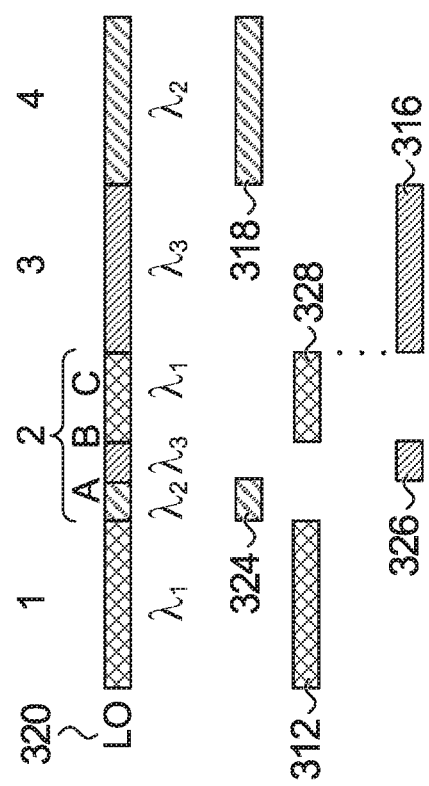
FIG. 3C illustrates another example of a frame structure indicating how signals for particular receivers can be detected according to an aspect of the disclosure.

FIG. 3C illustrates how the LO wavelength may be switched for a sub-slot mode, and as a result, the detected optical signal. The wavelength of the LO is shown to be $\lambda_1$ in a first slot, $\lambda_3$ in a third slot and $\lambda_2$ in a fourth slot. A second slot is shown to be subdivided into three sub-slots A, B and C. In the first sub-slot A of the second slot, the LO is shown to be $\lambda_2$. In the second sub-slot B of the second slot, the LO is shown to be $\lambda_3$. In the third sub-slot C of the second slot, the LO is shown to be $\lambda_1$. Based on the LO being switched to the wavelengths identified above, the receiver ends up detecting data from the same ANs as in FIG. 3B in the first, second and third slots 322, 330 and 332. In the first sub-slot A of the second slot, the LO is shown to detect a signal 324 from AN_1. In the second sub-slot B of the second slot, the LO is shown to detect a signal 326 from AN_N. In the third sub-slot C of the second slot, the LO is shown to detect a signal 328 from AN_2.

The sub-slots in FIG. 3C are not identical in sub-slot size. There may be a minimum sub-slot size that is based on part on the LO switching time and minimal data transmission duration that is desirable. A given slot may be divided into sub-slots that are a multiple of the minimum sub-slot size.

Figure 4A:
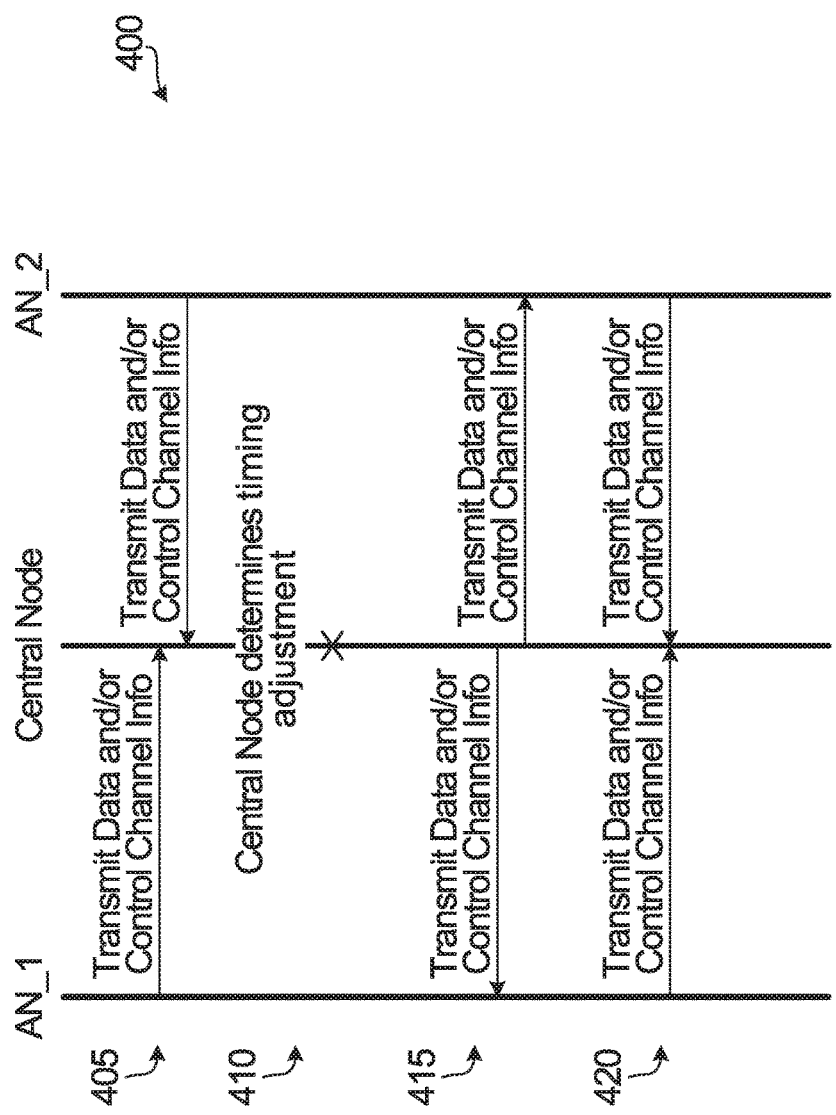
FIG. 4A is a signalling diagram of illustrating how communications occur for synchronizing signalling between two access nodes and a central node according to an aspect of the disclosure.

The central node performs two basic operations, one that is somewhat periodic in nature and the other that is continuous and ongoing. The first operation performed by the central node is to synchronize the frames of the optical signals from the ANs coupled to the central node. This is performed by the central node and ANs exchanging data. FIG. 4A is a signalling diagram 400 that illustrates communications exchanged between the central node and two ANs. At 405, the two ANs provide control information. At 410, the central node can determine what timing adjustments are needed to align each of the ANs to one another. At 415, the central node provides the timing adjustment information to the respective ANs. Once the ANs have received their respective timing adjustments, at 420, the ANs transmit data and control information so that the data and control information are synchronized at the central node. While the transmissions from the two ANs are shown in the figure to be transmitted at the same time, due to propagation delay or other delay, they signals may be transmitted at slightly different time, but are synchronized at the central node. The synchronization is performed periodically. For example, it may be performed at least at a predetermined interval to ensure that synchronization is maintained, or it may be performed if the slot size is changed or some other feature of the system is changed that could affect the synchronization of the signals.

In some implementations, the central node has its own slot timing and frame numbering. The frame number is cycled through from 1, 2, . . . , N. The central node measures the slot timing misalignment and frame number misalignment with regard to the slot timing and frame number of control channels received from the ANs. The central node sends the slot timing misalignment and frame number misalignment information to the access nodes in order to allow the ANs to adjust the slot timing and frame numbering for synchronization with the central node and the other ANs. Once the synchronization is completed, data can be transmitted from the ANs.

Figure 4B:
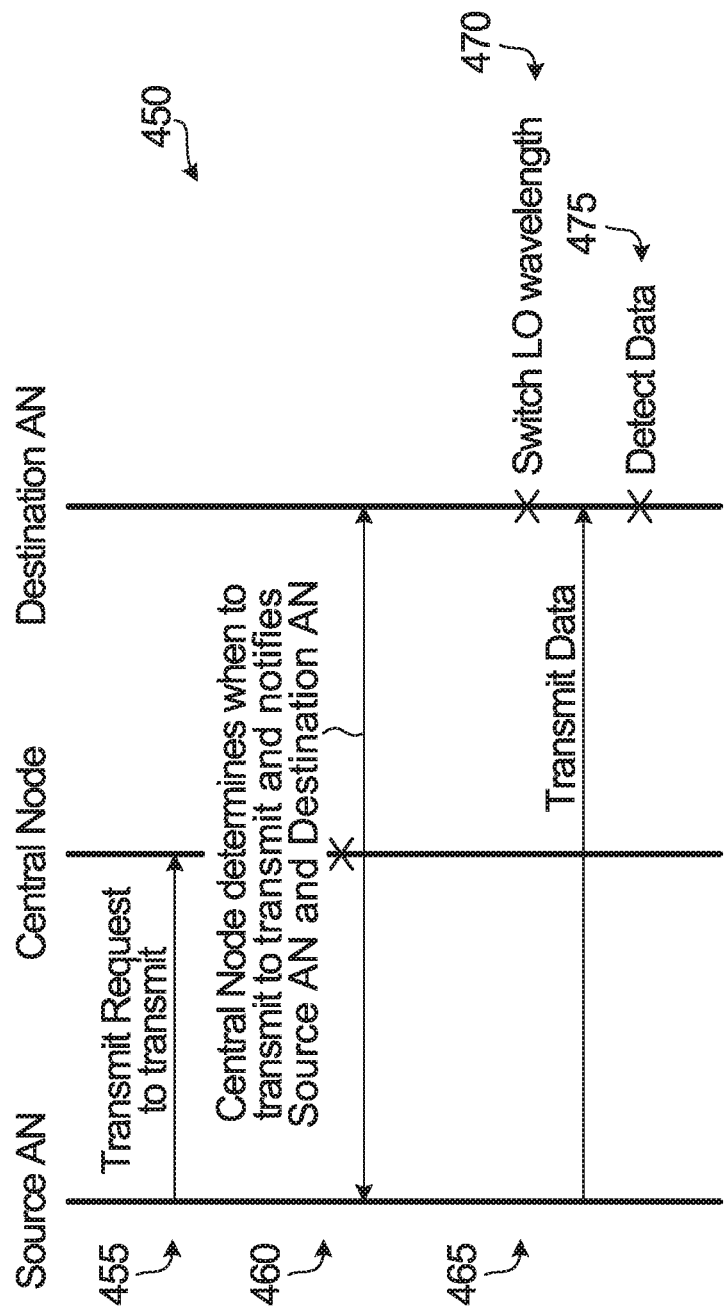
FIG. 4B is a signalling diagram of illustrating how communications occur for scheduling and routing data signals between a source access node, a central node and a destination access node according to an aspect of the disclosure.

Once the first functionality is completed and the signals are synchronized, the functionality of the central node may generally focus on scheduling of the ANs and routing of data. FIG. 4B is a signalling diagram 450 that illustrates communications exchanged between a source AN, the central node and a destination AN. The communication between the source AN, the central node and the destination AN to schedule and route data may occur over multiple slots. For example, at 455 the source AN sends, on the control channel, a request to the central node for a future slot to send data to the destination AN. At 460, the central node decides when to schedule the source AN data and sends grant information, on the control channel, to the source AN indicating when the source node can transmit. The central node also sends information, on the control channel, to the destination AN indicating when the source node will transmit. The information also indicates the wavelength of the signal to be received either directly by indicating the wavelength or by identifying the source AN, if the destination AN knows the wavelength of the source ANs. After receiving the grant information the source node, at 465, the source node transmits the data and the central node forwards the data. Before the data arrives 470 at the destination AN, the destination AN, having previously received the control channel information corresponding to the data, fast switches the LO wavelength so as to be able to detect the data 475 on the proper wavelength.

The signaling steps described above occur over multiple slots. In should be understood that the signalling may not necessarily occur over consecutive slots. For example, propagation delay alone may be longer than a single slot, and as a result, the communication between the central node and the access node may occur over multiple slots to complete a back and forth cycle. Furthermore, it may take several iterations over multiple slots to synchronize the various ANs.

The control channel frame does not have to be exactly aligned with the data slot, it can be designed to be a little bit ahead so the AN can receive grant information a little bit early which may allow the AN to transmit data in the same slot. Another option may be that the control channel frame can be shorter than the slot size allocate for the data, so that in each data slot, there are multiple control channel frames to allow the AN can receive the grant info early.

In some embodiments, the central node is responsible for aligning the control channel frames and data frames when the control channel frames and the data frames reach the output port of the first coupler, for example coupler 112 in FIG. 1. This synchronization may be achieved using bidirectional communication between the ANs and the central node over the control channels.

The central node controller, for example 116 in FIG. 1, is responsible for slot synchronization. In some implementations, the central node controller determines a misalignment between the timing of control channel frames of two ANs. An adjustment based on the determined misalignment is sent to the two ANs via the control channel. In some embodiments, the control channels may all be transmitted using a same wavelength, as long as they are transmitted between the central node and the ANs on different fibers to avoid interfering with one another. In some embodiments, the control channels may be transmitted on one or more different wavelengths. Once the control channel frames of the two ANs are aligned, one of those control channel frames can be aligned with a third AN, and so on until the control channel frames of all of the ANs are aligned. Because for each AN the control channel frame is synchronized with its associated data frame, aligning the control channel frames of multiple ANs also aligns the data frames of those ANs. The individual access nodes make timing adjustments to their respective signals. The central node controller may take into consideration the differential propagation delay due to fiber length difference, if any.

In other implementations, the ANs may be synchronized to a reference timing signal generated by the control controller.

The frame and slot durations can be variable in duration to allow for adjusting of the transmission and synchronization timing.

The central node controller may also be responsible for scheduling of transmission by the source ANs. The central node controller receives requests for transmission slot assignments from one or more of the ANs over the control channels. The central node controller performs scheduling of the ANs transmissions and notifies the ANs of the slot assignments the ANs are granted.

Figure 5A:
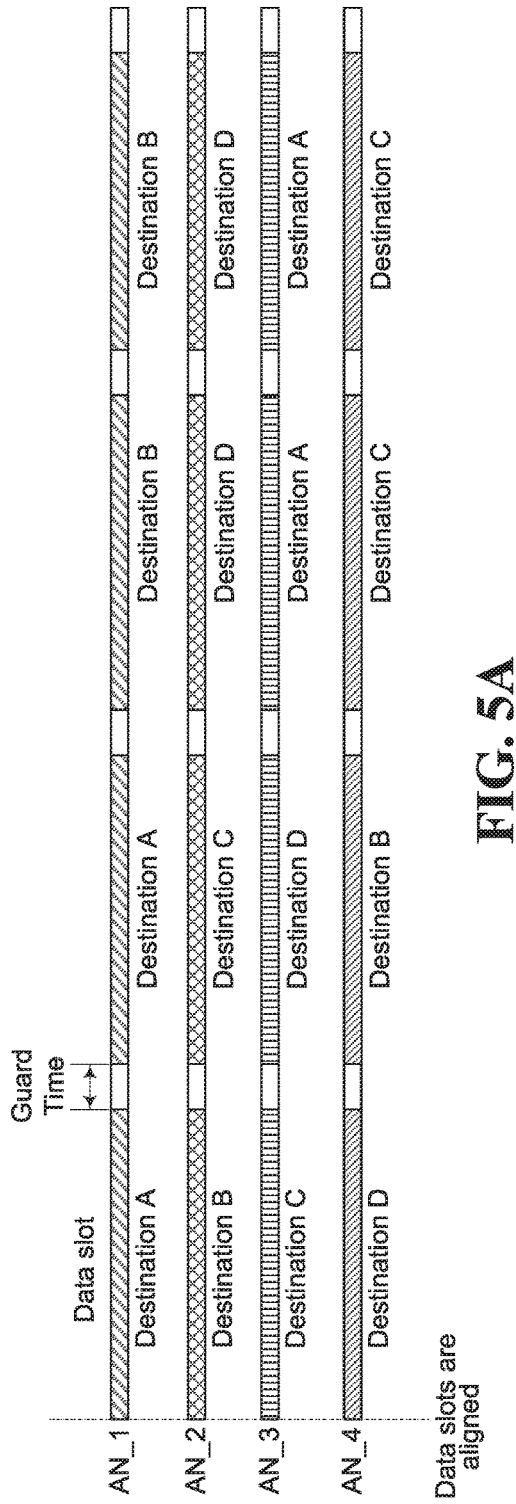
FIG. 5A illustrates an example of a synchronized unicast frame structure for transmitting to mutually exclusive destinations according to an aspect of the disclosure.

In some implementations, the destination may be dynamically assigned for each time slot. FIG. 5A illustrates a representation of four slots of aligned data signals from four ANs, AN_1, AN_2, AN_3 and AN_4. In FIG. 4 AN_1 is scheduled to transmit to Destination A in the first slot, Destination A in the second slot, Destination B in the third slot and Destination B in the fourth slot. AN_2, AN_3 and AN_4 are scheduled to various destinations. In the example of FIG. 5A, the destination ANs are mutually exclusive to one another, allowing for N×N interconnects, where N is the number of ANs connected to the central node.

Figure 5B:
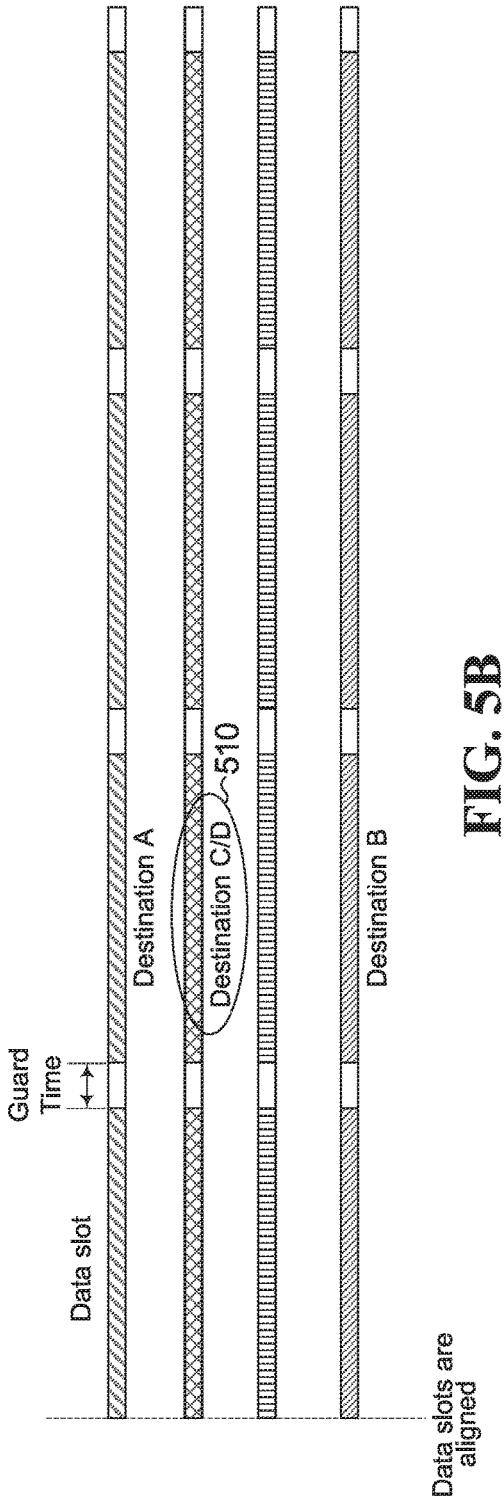
FIG. 5B illustrates an example of a synchronized frame structure for transmitting data to mutually exclusive destinations as well as broadcasting common information to other destinations according to an aspect of the disclosure.

As opposed to each destination being mutually exclusive to each other as shown in FIG. 5A, other implementations may allow for one or more data slots of one or more channels to be used to send to multiple destinations in multi-cast mode. FIG. 5B illustrates an example in which AN_2 is scheduled to send to Destinations C and D in the second slot 510. In this case, another data channel (from AN_3) is idle for that time slot, because two ANs are receiving data from AN_2.

A particular implementation includes the switching architecture embodied in the form of an AN line card. The AN line card may be configured for example to be installed in a data center Top of Rack (TOR). FIG. 6 is a schematic diagram of an AN line card 600 according to an embodiment of the present disclosure. FIG. 6 may be considered an example of one of the AN in FIG. 1. The AN line card 600 includes a fixed wavelength data transmitter 605, a coherent detection burst mode-receiver 610 coupled to a fast switched LO 615, a control channel Tx 620, a control channel Rx 622, a WDM combiner 625 to multiplex a data channel and a control channel, a WDM demultiplexer 630 to demultiplex the data channel from the control channel, a Virtual Output Queue (VOQ) buffer 635 and a processing unit 640.

For transmissions being received at the AN line card 600, the coherent detection burst mode-receiver 610 receives all wavelengths in a combined optical signal relayed by a central node (not shown) coupled to the AN line card 600. WDM demultiplexer 630 receives the combined optical signal from the central node including multiple optical data signals and an OOB CC optical signal associated with optical data signals. The optical data signals and the OOB CC optical signals are separated by the WDM demultiplexer 630. The OOB CC optical signal is detected using the control channel Rx 622 and the optical data signals are detected by the coherent detection burst mode-receiver 610. The LO 615 is switched to a particular wavelength to recover the data intended for the AN line card 600 at a particular time slot based on control channel information detected by the control channel Rx 622 and processed by the processing unit 640.

For transmissions being transmitted by the AN line card 600, the processing unit 640 receives data that is to be transmitted. The data is provided to the fixed wavelength data transmitter 605 to generate the optical data signal. Control channel information defining the scheduling and destination of the data is provided to control channel Tx 620 to generate the OOB CC optical signal. The optical data signal and the OOB CC optical signal are combined by the WDM combiner 625. The resulting combined optical signal is propagated to the central node where it is routed to its destination as described above.

The VOQ buffer 635 allows data to be temporarily buffered before transmission by the AN line card 600 while scheduling is being arranged by the central node. The VOQ buffer 635 may also allow for buffering of a received signal arriving at the AN line card 600, if necessary.

The processing unit 640 is responsible for actions such as, but not limited to, maintaining the VOQ of the VOQ buffer 635, sending request to the central node through OOB CC, and receiving grant from the central node, setting and controlling signal transmission wavelength and timing, controlling channel transmission setup and controlling channel Rx processing.

Figure 7:
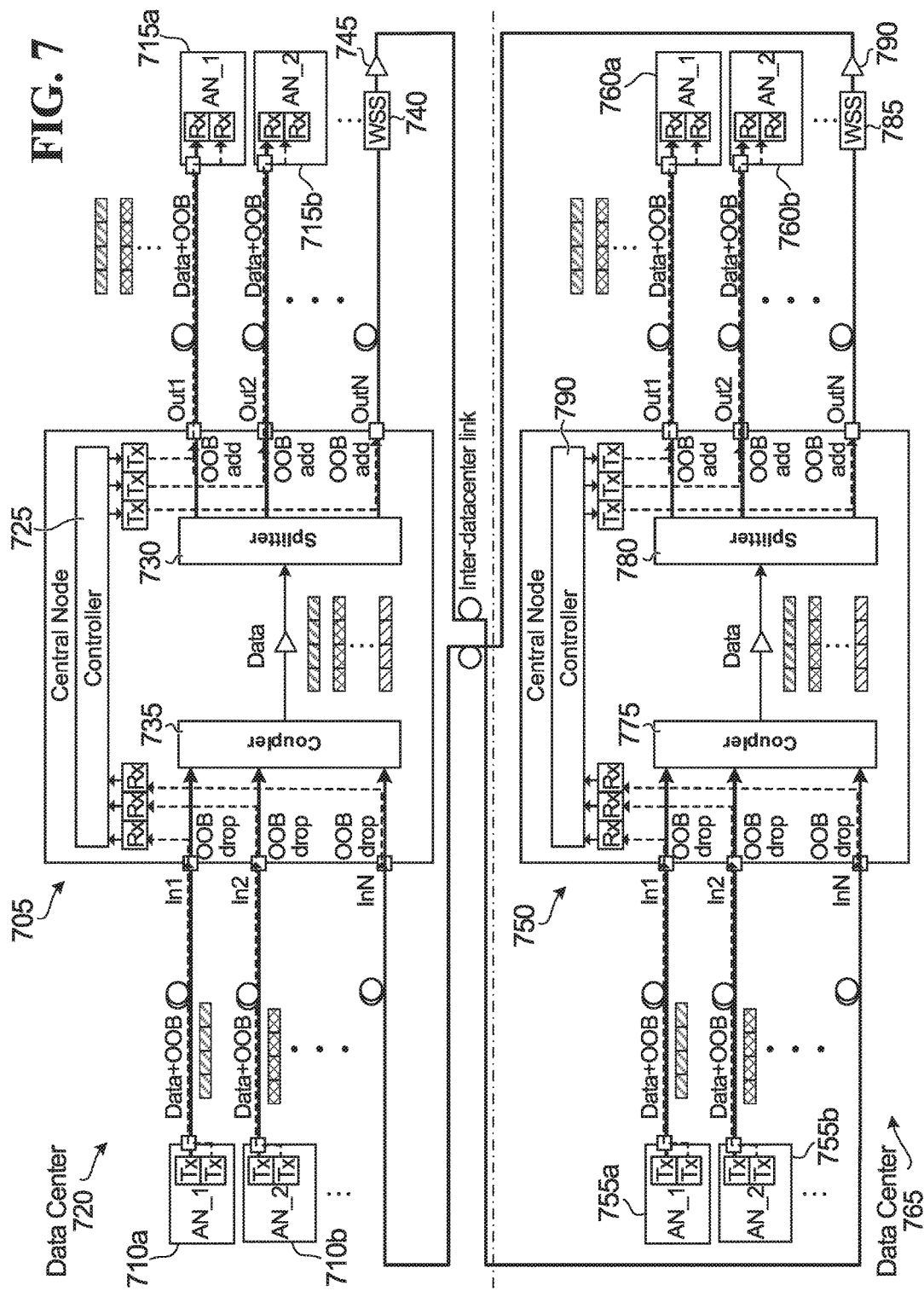
FIG. 7 is a schematic diagram of a coherent wavelength switching architecture that may be used between central nodes in network according to an aspect of the disclosure.

FIG. 7 illustrates an example of how two optical interconnecting network architectures in two separate data centers may be coupled together to allow ANs from a first data center to communicate with ANs of a second data center. FIG. 7 shows a first central node 705 coupled to ANs 710a and 710b and coupled to ANs 715a and 715b that are located within a first data center 720. FIG. 7 also shows a second central node 750 coupled to ANs 755a and 755b and ANs 760a and 760b that are located within a second data center 765. The connectivity and operation of the first central node 705 and the second central node 750 are similar to that described for FIG. 1. However, in addition to the normal operation of the central nodes and their respective ANs, a WDM splitter 730 of the central node 705 in the first data center 720 sends the selected optical signals to a WDM coupler 775 of the central node 750 in the second data center 765. Likewise, a WDM splitter 780 of the central node 750 in the second data center 765 sends the selected optical signals to a WDM coupler 735 of the central node 705 in the first data center 720. Wavelength selective switch (WSS) 740 and amplifier 745 are located between the output of central node 705 and the input to central node 750. WSS 785 and amplifier 790 are located between the output of central node 750 and the input of central node 705. The WSS is used to select the signals (wavelengths) for inter-datacenter connection. In some other implementations, the WSSs and the amplifiers may not be necessary.

With the ANs operating in continuous mode, it is possible to realize inter-datacenter communication directly in optical domain.

In order to coordinate between the two data centers, central node controllers 725 and 790 are controlled by a software defined networking (SDN) controller (not shown). The SDN controller may be located elsewhere in the network containing the two data centers and communicates with the central node controllers for the purpose of scheduling and synchronization. The inter-datacenter links are generally static, so establishing and dismantling these links may occur less frequently than the slot based routing between the ANs and the central node of a respective datacenter architecture.

FIG. 7 only includes a single central node in each of two data centers. It is to be understood that each data center may include more than one central node and there may be more than two data centers connected together. Furthermore, while only one channel is shown connected between the two central nodes, it is to be understood that multiple channels are possible between two central nodes. In addition, while data centers are described with respect to FIG. 7, it is to be understood that the central nodes could be used in alternative locations other than data centers.

Figure 8:
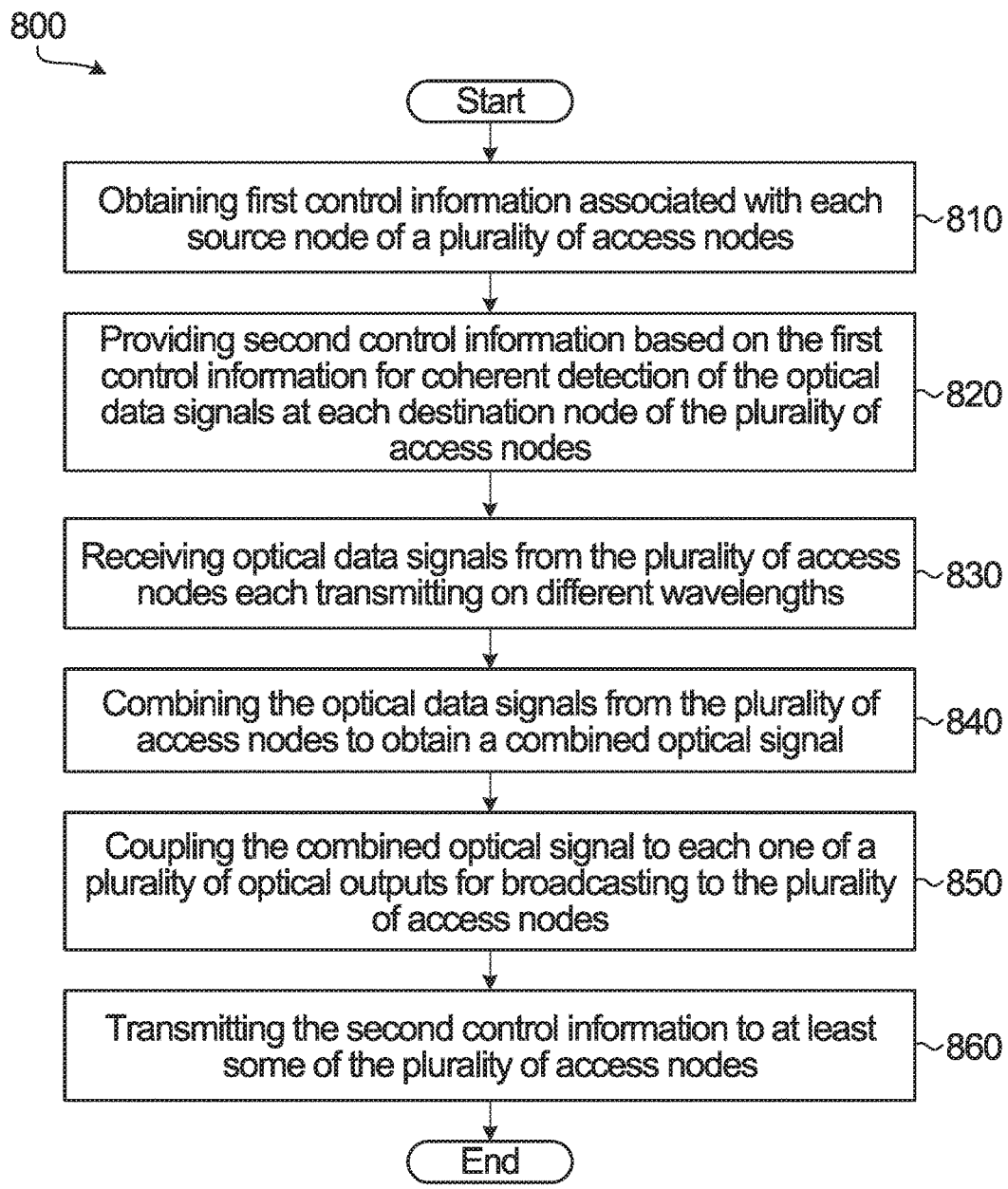
FIG. 8 illustrates a flow diagram for implementing a coherent wavelength switching architecture according to example embodiments described herein.

FIG. 8 is a flow chart illustrating steps in a method 800 for controlling communication between a plurality of access nodes. The method as described in FIG. 8 may be considered as a series of steps that are performed by a central node to enable the central node to facilitate interconnection between two ANs. Because the process of transmitting typically occurs over multiple slots, i.e. as described with reference to FIG. 4B above, the steps may not be listed in an order that they would be performed for only a single frame of data being transmitted. However, the steps collectively include the functionality that is performed for transmission from one AN to another.

Step 810 involves obtaining first control information associated with each source node of a plurality of access nodes. The first control information includes connection requests from source nodes of the plurality of access nodes. In some embodiments, the first information may also be generated at the central node e.g. at a request of a destination node desiring to "listen in" to the source node. Step 820 involves providing second control information based on the first control information for coherent detection of the optical data signals at each destination node of the plurality of access nodes. In some embodiments, the second control information includes wavelengths for local oscillators of the destination nodes to be tuned for coherent detection of the optical data signals from the source nodes, so that each destination node can coherently detect an optical data signal that is intended for the respective destination node. In some embodiments, the second control information includes information defining when a source node is scheduled to transmit an optical data signal. Step 830 involves receiving optical data signals from the plurality of access nodes each transmitting on different wavelengths. Step 840 involves combining the optical data signals from the plurality of access nodes to obtain a combined optical signal. Step 850 involves coupling the combined optical signal to each one of a plurality of optical outputs for broadcasting to the plurality of access nodes. Step 860 involves transmitting the second control information to at least some of the plurality of access nodes. In some implementations, transmitting the second control information involves transmitting the second control information in synchronization with the combined optical signal coupled to each of the plurality of optical outputs.

The destination AN may know the wavelength of the source ANs so as long as the destination AN is informed of the source node it is to be receiving from, the destination AN knows the wavelength it needs to tune the LO to. In a different implementation, the destination AN is told when to switch the LO to a specific wavelength.

Figure 9:
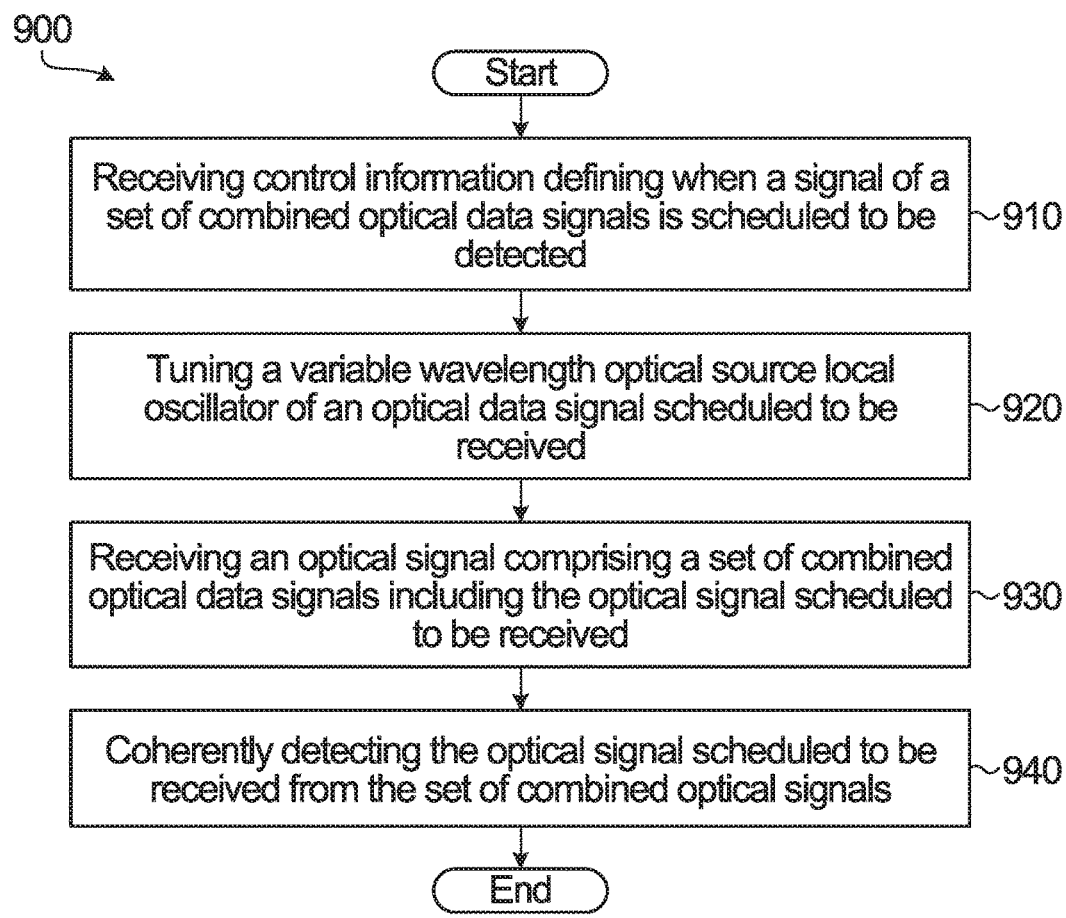
FIG. 9 illustrates a flow diagram for implementing a coherent wavelength switching architecture according to another example embodiments described herein.

FIG. 9 is a flow chart illustrating steps in a method 900 for detecting an optical data signal at access nodes. The method as described in FIG. 9 may be considered as a series of steps that are performed by a destination access node to enable the destination access node to facilitate detecting a received optical signal. Because the process of receiving and detecting occurs over multiple slots, the steps may not be listed in an order that they would be performed for only a single frame of data being transmitted. However, the steps collectively include the functionality that is performed for receiving and detecting an optical data signal at a destination AN.

Step 910 involves receiving control information defining when data signal of a set of combined optical data signals is scheduled to be detected. The control information may be in the form of an OOB CC optical signal or an electrical control signal. The OOB CC optical signal may be transmitted as a part of an optical signal including the optical data signal. The electrical signal may be received on an alternative electrical path. Step 920 involves tuning a variable wavelength optical source local oscillator to a wavelength of an optical data signal scheduled to be received. Step 930 involves receiving an optical signal at an access node, the optical signal including a set of combined optical data signals including the optical signal scheduled to be received. Once the variable wavelength optical source local oscillator is switched to a wavelength and the AN receives the set of combined optical data signals, the AN coherently detects the optical data signal scheduled to be received from the set of combined optical data signals.

Numerous modifications and variations of the present disclosure are possible in light of the above teachings. It is therefore to be understood that within the scope of the appended claims, the disclosure may be practiced otherwise than as specifically described herein.

The invention claimed is:

1. An optical central node for interconnecting a plurality of access nodes, the optical central node comprising:
   a coupler configured to combine optical data signals from the plurality of access nodes each transmitting on a different wavelength, to obtain a combined optical signal;
   a splitter configured to couple the combined optical signal to each one of a plurality of optical outputs for broadcasting to the plurality of access nodes;
   a controller configured to:
      determine a timing misalignment between an optical data signal of a source node that is one of the access nodes of the plurality of access nodes and a reference timing signal;
      send a timing adjustment message to the source nodes in order to control when the transmission of the optical data signal occurs to synchronize the timing of the source node with the reference timing signal;
      obtain first control information associated with the source node of the plurality of access nodes; and
      provide second control information based on the first control information for coherent detection of an optical data signal from the source node at a destination node of the plurality of access nodes.

2. The optical central node of claim 1, wherein the first control information comprises a connection request received from the source node.

3. The optical central node of claim 1, wherein the second control information comprises a wavelength for a local oscillator of the destination node to be tuned to for coherent detection of the optical data signal from the source node, wherein the controller is further configured to transmit the second information to the destination node.

4. The optical central node of claim 1, wherein the second control information comprises information defining when the source access node is scheduled to transmit the optical data signal, wherein the controller is further configured to transmit the second control information to the source node.

5. The optical central node of claim 4, wherein the controller is further configured to transmit the second control information to the destination node.

6. The optical central node of claim 1, wherein the controller is further configured to transmit a control signal carrying at least one of the first and second control information, wherein the control signal comprises at least one of an out-of-band (OOB) optical signal and an electrical signal.

7. The optical central node of claim 6, wherein the control signal carries the first control information and comprises the OOB optical signal, which is generated at the source node, and wherein the source node comprises a wavelength division multiplexer (WDM), configured to combine the optical data signal and the generated OOB optical signal.

8. The optical central node of claim 6, wherein the control signal carries the second control information and comprises the OOB optical signal, and wherein the destination node comprises a wavelength division demultiplexer (WDD) configured to separate the optical data signal and the second control information associated with the optical data signal.

9. The optical central node of claim 1, wherein the coupler comprises a wavelength division multiplexer (WDM).

10. The optical central node of claim 1, wherein the controller is configured to synchronize the optical data signals by:
    determining a timing misalignment between an optical data signal of each access node of the plurality of access nodes and the reference timing signal;
    sending a timing adjustment message to each of the access nodes in order to control when the transmission of the optical data signals occur to synchronize the timing of the access nodes with the reference timing signal.

11. The optical central node of claim 1, wherein the controller is configured to synchronize the optical data signals by:
    determining a timing misalignment between an optical data signal of the source node of the plurality of access nodes and an optical data signal of a second access node of the plurality of access nodes;
    sending a timing adjustment message to the second access node in order to control when the transmission of the optical data signal occurs to synchronize the timing of the source node and the second access node; and
    repeating the determining and sending between the source node and other access nodes of the plurality of access nodes until the optical data signals of the plurality of access nodes are synchronized.

12. The optical central node of claim 1, wherein the controller is configured to perform scheduling of transmissions of the plurality of access nodes.

13. The optical central node of claim 1 further comprising an optical amplifier located subsequent to the coupler to amplify the set of the multiplexed optical signals.

14. The optical central node of claim 1 wherein the plurality of access nodes are coupled to the optical central node in a star configuration.

15. A method for interconnecting a plurality of access nodes comprising:
    determining a timing misalignment between an optical data signal of a first access node of the plurality of access nodes and a reference timing signal;
    sending a timing adjustment message to the first access node in order to control when the transmission of the optical data signal occurs to synchronize the timing of the first access node with the reference timing signal;
    obtaining first control information associated with each source node of the plurality of access nodes;
    providing second control information based on the first control information for coherent detection of the optical data signals at each destination node of the plurality of access nodes;
    receiving optical data signals from the plurality of access nodes each transmitting on different wavelengths;
    combining the optical data signals from the plurality of access nodes to obtain a combined optical signal;
    coupling the combined optical signal to each one of a plurality of optical outputs for broadcasting to the plurality of access nodes; and
    transmitting the second control information to at least some of the plurality of access nodes.

16. The method of claim 15, wherein the first control information comprises connection requests from source nodes of the plurality of access nodes.

17. The method of claim 15, wherein the second control information comprises at least one of:
    wavelengths for local oscillators of destination nodes of the plurality of access nodes to be tuned to; and
    information defining when each source node is scheduled to transmit an optical data signal.

18. The method of claim 15, wherein transmitting the second control information comprises at least one of:
    transmitting to the source nodes information defining when the source nodes are scheduled to transmit the optical data signals so the source nodes know when to transmit the optical data signals; and
    transmitting to the destination nodes information defining when the source nodes are scheduled to transmit the optical data signals and the wavelength so the destination nodes know when to switch the local oscillators of the destination nodes to coherently detect the optical data signals.

19. The method of claim 15, wherein the optical data signals are divided into slots.

20. The method of claim 19, wherein the slots are divided into sub-slots.

21. The method of claim 15, wherein synchronizing the optical data signals from the plurality of access nodes comprises:
    determining a timing misalignment between an optical data signal of the first access node of the plurality of access nodes and an optical data signal of a second access node of the plurality of access nodes;
    sending a timing adjustment message to the second access node in order to control when the transmission of optical data signals occurs in order to synchronize the timing of the first access node and the second access node; and
    repeating the determining and sending between the first access node and other access nodes of the plurality of access nodes until the optical data signals of the plurality of access nodes are synchronized.

22. The method of claim 15 comprising scheduling of transmissions of the plurality of access nodes.

23. The method of claim 15 further comprising:
    receiving third control information from a software defined networking (SDN) controller that coordinates connections and schedules connections between access nodes of the plurality of access nodes; and
    generating the second control information based on the third control information.

24. A system comprising:
a plurality of access nodes, each access node configured to transmit and receive an optical signal wherein:
   when transmitting, an access node is configured to transmit an optical data signal using a fixed wavelength optical source and first control information; and
   when receiving, an access node is configured to receive an optical signal and coherently detect a portion of the optical signal using a switchable wavelength local oscillator; and
a central node, the central node comprising:
   a coupler configured to combine optical data signals from the plurality of access nodes each transmitting on a different wavelength, to obtain a combined optical signal;
   a splitter configured to couple the combined optical signal to each one of a plurality of optical outputs for broadcasting to the plurality of access nodes;
   a central node controller configured to:
      determine a timing misalignment between an optical data signal of a source node that is one of the access nodes of the plurality of access nodes and a reference timing signal;
      send a timing adjustment message to the source nodes in order to control when the transmission of the optical data signal occurs to synchronize the timing of the source node with the reference timing signal;
      obtain first control information from each source node of the plurality of access nodes and generate second control information based on the first control for coherent detection of the optical data signals at each destination node of the plurality of access nodes; and
      transmit the second control information to at least some of the plurality of access nodes.

25. The system of claim 24, wherein the first control information comprises connection requests received from the source nodes.

26. The system of claim 24, wherein the second control information comprises at least one of:
   wavelengths for local oscillators of destination nodes of the plurality of access nodes to be tuned to; and
   information defining when a source access node is scheduled to transmit an optical data signal.

27. The system of claim 24, wherein the optical data signals from the plurality of access nodes of the combined optical data signal are synchronized at an output port of the coupler.

28. The system of claim 25, where the central node performs scheduling of transmissions of the plurality of access nodes.

29. The system of claim 25, wherein the central node is configured to multicast a same optical data signal to more than one destination access node.

30. The system of claim 25, wherein the central node is controlled by a software defined networking (SDN) controller, the SDN controller also configured to control a central node in a second system such that the central node of the second system appears to the central node as an access node.

* * * * *